G. W. BEYERLE.
OLIVE PITTER.
APPLICATION FILED APR. 23, 1918.
1,311,589.
Patented July 29, 1919.
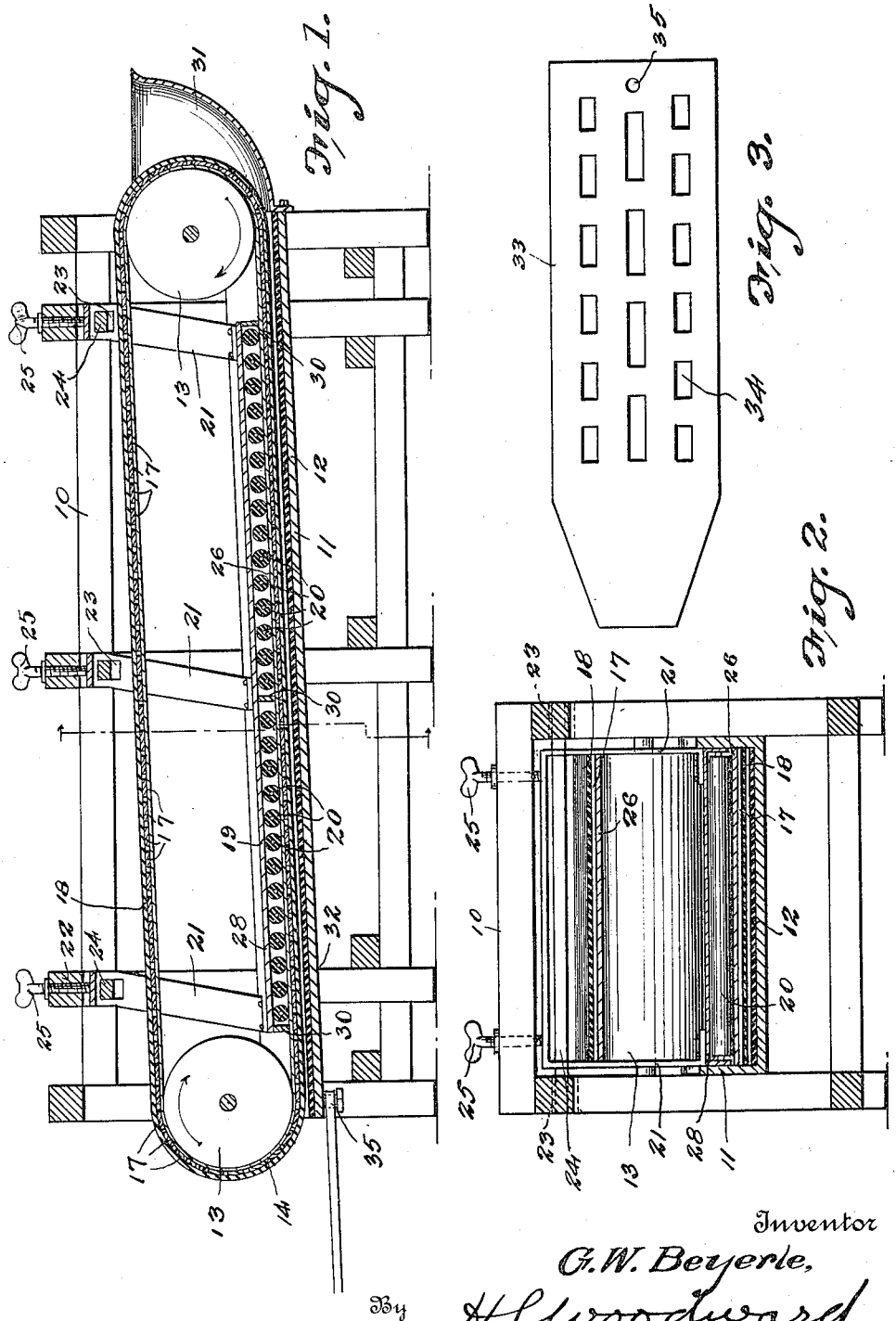
Inventor
G. W. Beyerle,
By H. S. Woodward
Attorney

UNITED STATES PATENT OFFICE.

GOTTLOB WM. BEYERLE, OF DENVER, COLORADO.

OLIVE-PITTER.

1,311,589.　　　　　Specification of Letters Patent.　　Patented July 29, 1919.

Application filed April 23, 1918. Serial No. 230,273.

*To all whom it may concern:*

Be it known that I, GOTTLOB W. BEYERLE, a citizen of the United States, residing at Denver, in the county of Denver and State of Colorado, have invented certain new and useful Improvements in Olive-Pitters, of which the following is a specification.

The invention has for an object to provide means for effecting economically and efficiently, the separation of the stones from the fruit meat of the olive, whereby the oil may be extracted from the meat portion and the stones treated separately for the extraction of the oil therein, so that the high grade oil from the meat will not be contaminated by that from the stones, as is the case with commercial oil production, where machines are used. It is an aim to provide a machine for effecting this work which will be simple to construct and maintain, and which will be liable in a minimum degree to derangement. It is also an aim to give such a device which will efficiently remove all of the meat from fruit of various sizes.

Additional objects, advantages, and features of invention will appear from the construction, arrangement and combination of parts comprising one of the possible embodiments of my invention, as hereinafter described and shown in the drawings, wherein, Figure 1 is a longitudinal sectional view of a machine constructed in accordance with my invention, Fig. 2 is a cross sectional view thereof, Fig. 3 is a detail of the screen element.

There is illustrated a frame 10 supporting an inclined trough 11 having a planiform bottom covered with a fixed sheeting 12 of rubber or other suitable resilient elements. At each end of the frame 10 there are mounted rollers 13, around which there is extended a belt 14, the lower sides of the rollers being disposed slightly above the plane of the bottom of the trough 11, so that the lower reach of the belt may readily pass through the trough in close relation to rubber sheeting 12 in the bottom of the trough. The belt 14 is preferably constructed with a backing of material of sufficient tensile strength, across which there are mounted a multiplicity of transversely arranged slats 17, and over these in turn there is provided a facing 18 of rubber, as shown. Extending over the major part of the length of the trough between the rollers 13, there is a frame 19, carrying a multiplicity of very small rollers 20, closely spaced longitudinally of the trough, and extending transversely thereof, their axes being in a plane parallel to the bottom of the trough, or nearly so, as may be found desirable, these rollers being held against rising more than a predetermined distance above the trough floor by means of arms 21 attached to the sides of the frame 19, extended upwardly beneath and stopping short of respective cross beams 22, forming part of the frame 10. The upper ends of the arms 21 are vertically slotted as at 23, and cross bars 24 are mounted in the upper part of the frame disposed slidably in each slot to hold the frame 19 against longitudinal movement in the trough, but yieldably for vertical movement within suitable limits. Engaged through the beams 22 there are respective set screws 25, adapted to be projected downwardly to bear upon the upper ends of the arms 21, whereby their upward movement is limited, and the frame with its rollers held so as to bear forcibly upon olives passing through the trough beneath the belt 14, as will be described.

It is believed preferable that the slats of the belt 14 should be spaced differently from the spacing of the axes of the rollers 20, so that jerky motion in the belt will be avoided as much as possible. In the present instance the belt 14 is indicated as having a non-elastic inner portion 26, upon which the slats 17 are secured.

The frame 19 includes angle pieces 28 at each side, extending longitudinally, the rollers 20 having trunnions engaged revolubly in suitable openings in the downwardly extending flanges of the angle pieces, while at suitable intervals the angle pieces are connected by transverse bars 30. The arms 21 preferably extend diagonally with respect to the plane of the trough, especially at their lower parts, and for a suitable distance longitudinally of the trough, in order that the device will function efficiently with a minimum liability of straining of the supporting framework.

A suitable hopper 31 is provided at the upper end of the trough, fitting snugly around the belt. At the lower or discharge end of the chute, the bottom may be sloped downwardly as indicated at 32, or otherwise constructed for proper use of the machine.

In use, the fruit being introduced into the hopper under a warm water spray, and the machine in operation, the rollers 13 being driven by any suitable power connections the fruit will be worked downwardly into the trough by the downward movement of the belt 14 within the hopper, and rolled along between the rubber belt 18 and the rubber facing 12 of the trough. When the rollers 20 are encountered by the belt 14 as it passes over the fruit, the frame 19 having been properly adjusted, the pressure upon the fruit will cause the meat to be broken away from the pits, and carried along in the trough between the pits. If desired, the frame 19 may be adjusted in closer relation to the bottom of the trough toward the discharge end than at the receiving end of the device, in order that the partly cleaned pits may be more closely engaged between the belt and trough facing, insuring the removal of the last portion of the meat. Also, the rolling action of the pits between the belt and trough facing will cause the adjacent surfaces of the pits to rub against each other, further assisting in the cleaning operation. The rolling action of the stock will cause it to move toward the discharge end of the trough, from which it may be allowed to drop into separator devices, such as a shaker screen 33, and other devices employed for separating the pits and meat.

The screen 33 comprises in this instance a sheet of metal formed with a multiplicity of longitudinal slots 34 spaced both laterally and longitudinally therein. At one end it is pivoted as at 35 beneath the discharge end of the trough 11 while its opposite end may be engaged by any suitable rocking mechanism.

What is claimed:

1. A device of the character described comprising a trough element having a facing of continuous cushion-like yielding friction material, a belt movable longitudinally therein having a friction surface opposed to that of the trough, means for so moving the belt, and rigid means for holding the belt in a predetermined spaced relation to the trough facing for the purposes described.

2. A device of the character described comprising a trough having a continuous facing of yielding friction material, a belt having a friction surface thereon opposed to that of the trough, means to move the belt longitudinally in the trough, and a multiplicity of rigidly supported closely spaced small transverse rollers mounted immediately over the belt.

3. A device of the character described comprising a frame, an inclined trough therein having a yielding friction surface in its bottom, transverse rollers at opposite ends of the trough, an endless belt element engaged therearound having the lower reach disposed for movement in close relation to the bottom of the trough, said belt including a friction surface and yieldingly constructed for the purposes described, a vertically movable frame carried by the first named frame, including supporting elements slidably engaged with the first named frame, a multiplicity of transverse rollers carried by the second named frame on axes in a common plane, immediately above said lower reach of the belt, and means in said first named frame operable to bear upon said arms to limit movement of said second named frame away from the trough.

In testimony whereof I have affixed my signature in presence of two witnesses.

GOTTLOB WM. BEYERLE.

Witnesses:
MOLLIE SCHRADSKY,
LORETTO M. RYAN.

Copies of this patent may be obtained for five cents each, by addressing the "Commissioner of Patents, Washington, D. C."